United States Patent
Recksiek et al.

(10) Patent No.: US 8,157,208 B2
(45) Date of Patent: Apr. 17, 2012

(54) LANDING FLAP DRIVE SYSTEM

(75) Inventors: Martin Recksiek, Hamburg (DE); Christoph Giebeler, Bremen (DE); Ina Brueckner, Boetersen (DE)

(73) Assignees: Airbus Deutchland GmbH, Hamburg (DE); Deutsches Zentrum Fuer Luft—und Raumfahrt E.V. (DLR), Cologne (DE)

( * ) Notice: Subject to any disclaimer, the term of this patent is extended or adjusted under 35 U.S.C. 154(b) by 176 days.

(21) Appl. No.: 11/911,231

(22) PCT Filed: Apr. 12, 2006

(86) PCT No.: PCT/EP2006/003392
§ 371 (c)(1),
(2), (4) Date: Dec. 26, 2007

(87) PCT Pub. No.: WO2006/108648
PCT Pub. Date: Oct. 19, 2006

(65) Prior Publication Data
US 2008/0191089 A1    Aug. 14, 2008

Related U.S. Application Data

(60) Provisional application No. 60/671,386, filed on Apr. 14, 2005.

(30) Foreign Application Priority Data

Apr. 14, 2005    (DE) .......................... 10 2005 017 307

(51) Int. Cl.
B64C 9/00      (2006.01)
B64C 9/02      (2006.01)
B64C 13/50     (2006.01)

(52) U.S. Cl. ....... 244/99.3; 244/213; 244/216; 244/99.9
(58) Field of Classification Search ................ 244/99.4, 244/99.3, 99.9, 99.2, 195, 224, 211–217, 244/76 A See application file for complete search history.

(56) References Cited

U.S. PATENT DOCUMENTS

| | | | | |
|---|---|---|---|---|
| 2,500,691 | A * | 3/1950 | Lear | 244/213 |
| 2,826,379 | A * | 3/1958 | Alberti et al. | 244/216 |
| 4,471,928 | A * | 9/1984 | Cole | 244/216 |
| 4,575,027 | A * | 3/1986 | Cronin | 244/224 |
| 4,688,744 | A | 8/1987 | Aldrich | |
| 5,092,539 | A * | 3/1992 | Caero | 244/99.9 |

(Continued)

FOREIGN PATENT DOCUMENTS

| | | |
|---|---|---|
| DE | 10339030 A1 | 3/2005 |
| EP | 0017756 A1 | 10/1980 |
| EP | 0411680 A1 | 2/1991 |

(Continued)

OTHER PUBLICATIONS

German Office Action dated Sep. 26, 2006 for German application No. 10 2005 017 307.1-22.

*Primary Examiner* — Tien Dinh
*Assistant Examiner* — Richard R. Green
(74) *Attorney, Agent, or Firm* — Christopher Paradies; Fowler White Boggs P.A.

(57) ABSTRACT

A landing flap drive system, in one example, includes a first drive motor for operating a landing flap. In this arrangement, the landing flap drive system is integrated in a track of the landing flap such that final assembly and integration of the system are facilitated to a significant extent.

11 Claims, 4 Drawing Sheets

U.S. PATENT DOCUMENTS

| | | | | |
|---|---|---|---|---|
| 5,161,757 A * | 11/1992 | Large | | 244/213 |
| 5,230,487 A * | 7/1993 | Gartelmann et al. | | 244/216 |
| 5,788,190 A * | 8/1998 | Siers | | 244/212 |
| 5,806,805 A * | 9/1998 | Elbert et al. | | 244/195 |
| 6,704,624 B2 * | 3/2004 | Ortega et al. | | 244/175 |
| 6,755,375 B2 * | 6/2004 | Trikha | | 244/99.4 |
| 2004/0200928 A1 | 10/2004 | Degenholtz et al. | | |
| 2008/0169383 A1 | 7/2008 | Patzelt et al. | | |

FOREIGN PATENT DOCUMENTS

| | | |
|---|---|---|
| EP | 1462361 A1 | 9/2004 |
| JP | 2004-291957 A | 10/2004 |
| RU | 19650 | 9/2001 |
| WO | 03/008266 A1 | 1/2003 |
| WO | 03/035469 A1 | 5/2003 |
| WO | 2005/021375 A1 | 3/2005 |

* cited by examiner

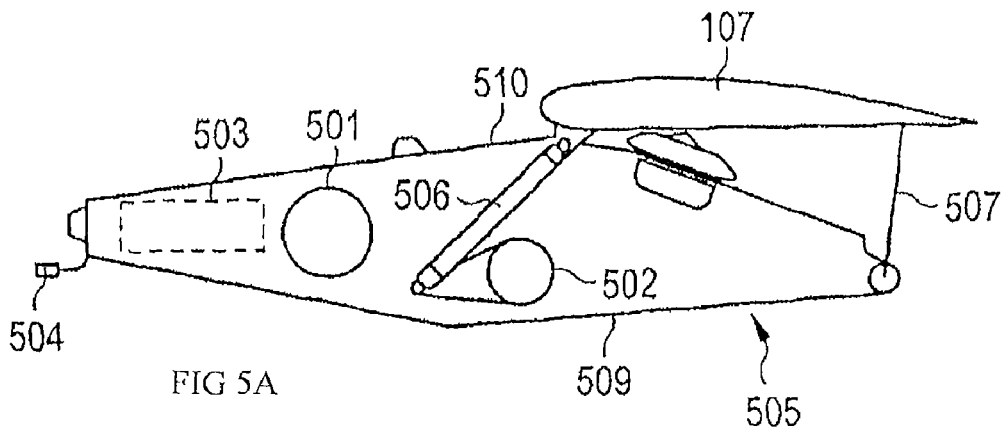
FIG 5A
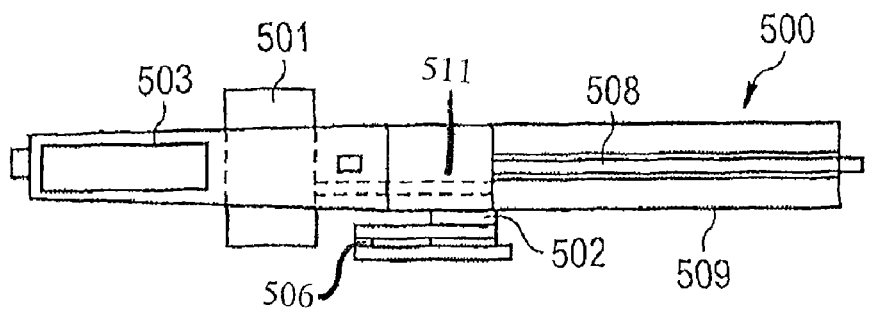
FIG 5B
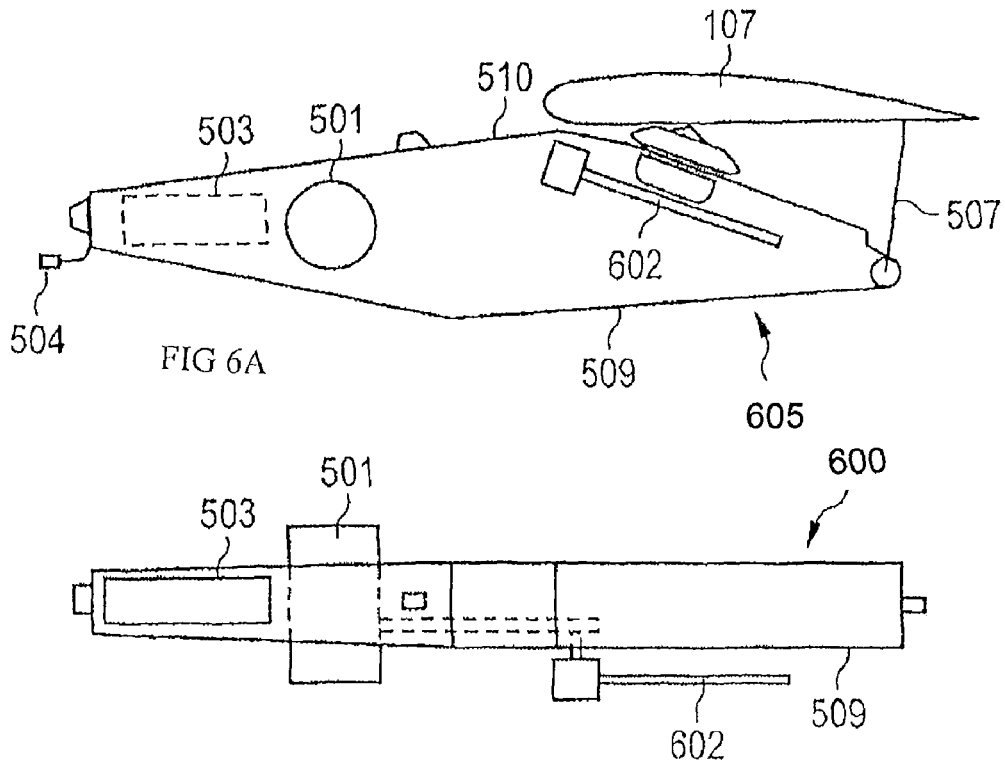
FIG 6A
FIG 6B

LANDING FLAP DRIVE SYSTEM

REFERENCE TO RELATED APPLICATIONS

This application claims the benefit of the filing date of German Patent Application No. 10 2005 017 307.1 filed Apr. 14, 2005 and of U.S. Provisional Patent Application No. 60/671,386 filed Apr. 14, 2005, the disclosure of which applications is hereby incorporated herein by reference.

FIELD OF THE INVENTION

The field relates to landing flap systems for aircraft.

BACKGROUND OF THE INVENTION

Today's landing flap drive systems, comprise a central drive with a central shaft transmission to the drive stations. Apart from these, for reasons of redundancy, there are also solutions involving two shaft arrangements, wherein the flaps of the left-hand and the right-hand wing are mechanically coupled together. These are drive systems in which generation of the mechanical drive performance takes place so as to be locally separated from the power takeoff at the individual drive stations that are distributed along the wing.

In landing flap systems with a central drive arrangement, the drive motor is located in the fuselage of the aircraft. The mechanical drive output is fed by way of a central shaft arrangement to the actuators of the respective drive stations. The actuators are linear drives or rotary drives. Since the shaft arrangement, starting from the fuselage, has to be provided right up to the outer landing flap, structural leadthroughs, deflection gear arrangements and universal joints or cardan joints are necessary. The installation expense of the final assembly of such a system may be considerable.

SUMMARY OF THE INVENTION

It is an object to provide for an improved landing flap drive system for aircraft.

According to an embodiment, a landing flap drive system for an aircraft comprises a first drive motor for operating a landing flap, wherein the landing flap drive system is integrated in a track of the landing flap.

By integrating the entire drive system in the track, the installation and the integration of the landing flap drive system in the aircraft may be facilitated to a significant extent. Furthermore, the production expenditure or pre-installation expenditure may be reduced because all the drive components can be integrated in the track beforehand, in the factory, prior to final assembly of the track.

According to a further embodiment, the landing flap drive system further comprises a step-down gear arrangement to reduce the operational speed of the landing flap.

In this way, an optimal operation point may be selected, depending on the selected motor speed.

According to a further embodiment, the landing flap drive system further comprises a second drive motor for operating the landing flap.

In this way, drive redundancy may be provided which may further enhance system safety and may minimise the risk of failure. Furthermore, for example, when a considerable load is experienced, the second drive motor may be switched on if necessary so as to improve the drive performance.

According to a further embodiment, the landing flap drive system further comprises a brake device for fixing the landing flap.

The brake device may be used in a supportive manner in that it absorbs, or compensates for, a compressive force that acts on the landing flap and thus relieves the drive motor. Furthermore, the brake device may be used for finally setting the landing flap, if the landing flap no longer has to be moved.

According to a further embodiment, the landing flap drive system further comprises a safety load path to ensure structural integrity, wherein the safety load path is designed to hold the landing flap in the case of structural failure.

According to a further embodiment, the landing flap drive system further comprises an actuator for activating the landing flap, wherein the actuator is driven by the first drive motor.

The actuator, for example, may be connected between the drive motor and the landing flap in order to transmit the drive force from the motor to the flap. For example, the actuator may be designed as a failsafe spindle or as a rotary actuator.

According to a further embodiment, the landing flap drive system further comprises a first attachment region for attaching the landing flap drive system to a wing of the aircraft, and a second attachment region for attaching the landing flap drive system to the landing flap.

In this way, the effort required for installing the landing flap drive system during final assembly may be considerably reduced in that the landing flap drive system that is integrated in the track is attached to the first attachment region on the wing of the aircraft. Essentially there may be no need for any more extensive installation beyond this. On the second attachment region, the landing flap drive system may simply be connected to the landing flap such that the landing flap can be operated.

According to a further embodiment, the landing flap drive system further comprises a first interface for connecting the landing flap drive system to an energy supply, and a second interface for connecting the landing flap drive system to a signal line for controlling the landing flap drive system.

According to this embodiment, the interfaces may be installed correspondingly already in the context of preassembly or pre-installation such that during final assembly, simple connection of the supply lines or signal lines to the landing flap drive system is all that is required.

According to a further embodiment, synchronisation of the first and the second drive motor takes place electronically without there being a need to provide mechanical coupling between the first drive motor and the second drive motor.

Furthermore, according to a further embodiment, synchronisation between various landing flap drive systems or between drive motors that each belong to different landing flap drive systems may be provided, wherein such synchronisation takes place on an electronic basis without mechanical coupling of the different landing flap drive systems.

According to a further embodiment, the first drive motor is an electromechanical motor.

According to a further embodiment, a track for a landing flap for an aircraft is disclosed, wherein the track comprises an integrated landing flap drive system.

The landing flap drive system, for example, may be integrated in the track prior to final assembly of the track. Such complete integration in the track may considerably reduce the effort required for assembly. There may be no need to provide structural leadthroughs through the fuselage and the trailing edge of the wing and the associated deflection gear and universal joints of the shaft arrangement that are necessary in centrally driven landing flaps. During final assembly, a track that is equipped with all the system components may only need to be attached underneath the wing and may need to be connected to the supply lines and signal lines and to the flap structure. Furthermore, the design space problems of redundant drives to be installed on the trailing edge of the wing may be solved in this way.

According to a further embodiment, an aircraft with an integrated landing flap drive system is provided.

According to a further embodiment, the use of an integrated landing flap drive system in an aircraft is provided.

Further embodiments are stated in the subordinate claims.

Below, preferred embodiments are described with reference to the figures.

BRIEF DESCRIPTION OF THE FIGURES

FIG. 5A shows a lateral view of a track-integrated landing flap drive system according to one embodiment.

FIG. 5B shows a top view of a track-integrated landing flat drive system according to one embodiment.

FIG. 6A shows a lateral view and a top view of a track-integrated landing flap drive system according to a future embodiment.

FIG. 6B shows a top view of a track-integrated landing flap drive system according to a further embodiment.

In the following description of the figures the same reference characters are used for identical or similar elements.

DETAILED DESCRIPTION

The examples described and drawings rendered are illustrative and are not to be read as limiting the scope of the invention as it is defined by the appended claims.

Figure 1:
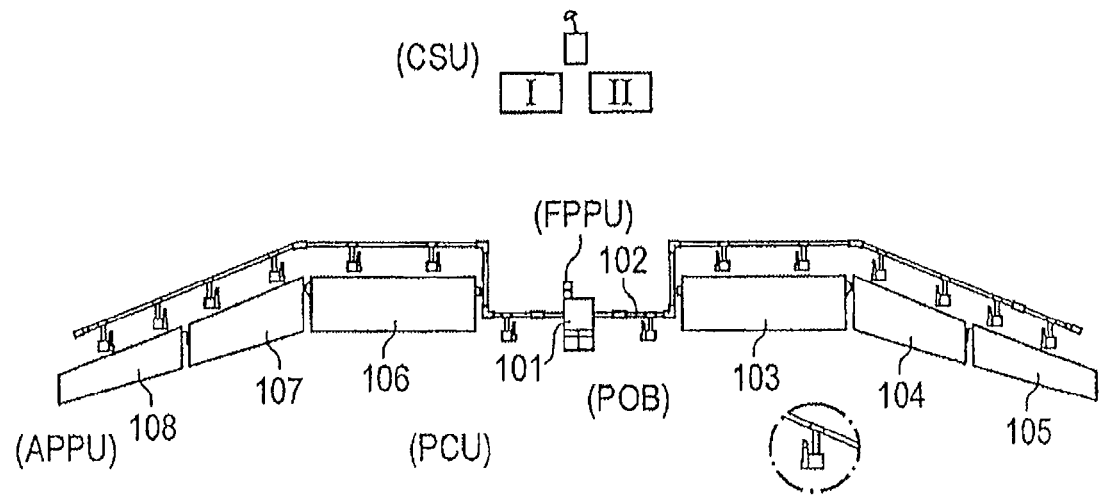
FIG. 1 shows a diagrammatic view of a typical landing flap system.

FIG. 1 shows a diagrammatic view of a landing flap system. Today's landing flap drive systems, generally speaking, comprise a central drive 101 arranged in the fuselage, and a central shaft arrangement 102. The central shaft arrangement 102 is used to transmit the driving power from the motor 101 to the individual landing flaps 103, 104, 105, 106, 107, 108. This may require extensive installation work such as, for example, leadthroughs in the fuselage.

Figure 2:
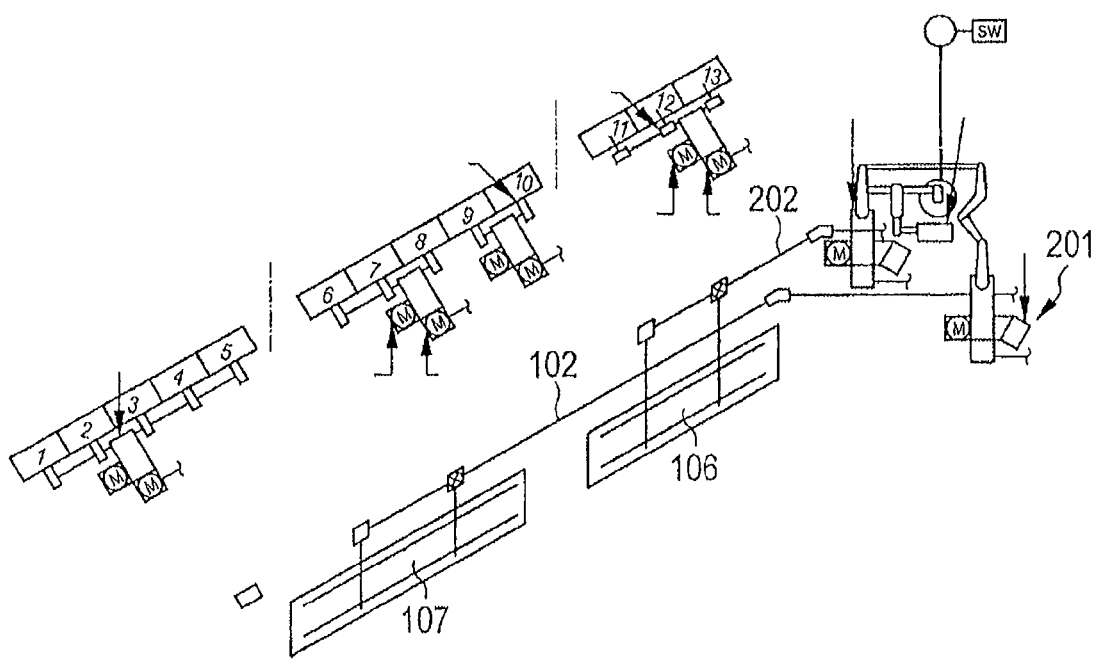
FIG. 2 shows a diagrammatic view of a further landing flap system.

FIG. 2 shows a diagrammatic view of a further landing flap system. As shown in FIG. 2, in this arrangement two shaft arrangements 102, 202 have been provided for reasons of redundancy, wherein the flaps 106, 107 of the left-hand wing, and the flaps of the right-hand wing (not shown in FIG. 2) are mechanically coupled to each other.

The landing flap systems shown in FIGS. 1 and 2 are drive systems in which the generation of the mechanical drive performance (by way of the motor unit 201) is locally separated from the power takeoff on the individual drive stations that are distributed along the wing.

Figure 3:
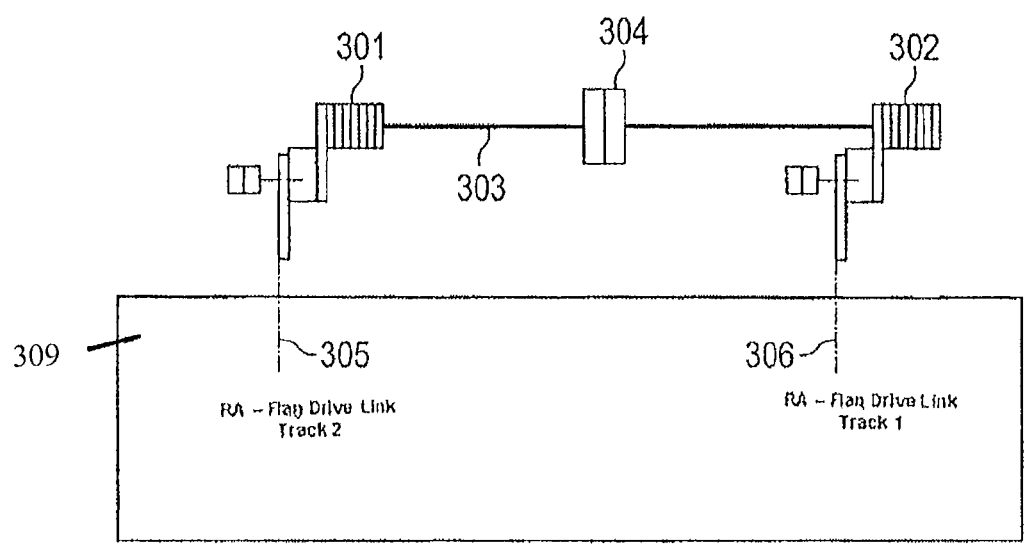
FIG. 3 shows one example of a diagrammatic view of a landing flap drive system with individual drives and a connecting shaft.
Figure 4:
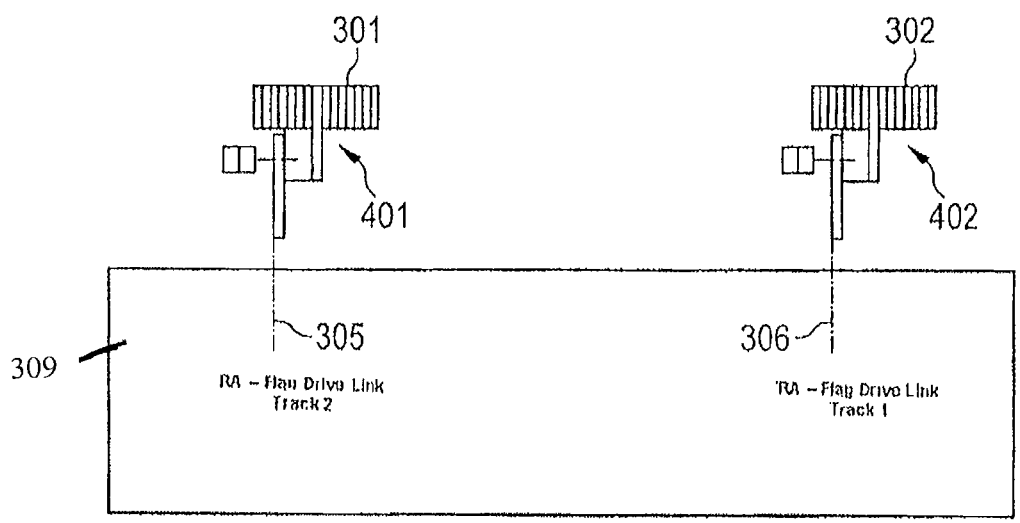
FIG. 4 shows another example of a diagrammatic view of a landing flap drive system with individual drives without a connecting shaft.

FIG. 3 shows a diagrammatic view of a landing flap drive system and a schematic landing flap 309, with individual drives 301, 302 and a connecting shaft 303 and brake 304. In this arrangement the inner and outer landing flaps may be moved independently of each other. In this solution the redundant drives of a flap segment may either be coupled by means of a shaft segment (see FIG. 3), or for each drive station 401, 402 may be driven by independent drives 301, 302 (see FIG. 4).

The reference characters 305, 306 designate the RA flap drive link track 2 or track 1.

In the case of landing flap systems with a central drive arrangement, the drive motor is located in the fuselage of the aircraft. The mechanical drive performance is fed by way of a central shaft arrangement to the actuators, which are, for example, designed in the shape of linear actuators or rotary actuators and which are associated with the respective drive stations. Since the shaft arrangement has to lead from the fuselage right to the outer landing flap, structural leadthroughs, deflection gearing and universal joints are necessary. The installation expenditure of the final assembly of such a system is very considerable.

Individual drives may significantly improve this situation because in this way large parts of the central drive arrangement can be done without. Furthermore, individual drives may provide the option of improved functional flexibility.

For example, according to an embodiment, there is no need to provide a shaft arrangement between both drives. In order to achieve good system availability and system safety, redundant drives may be installed for individual landing flaps or groups of landing flaps. Since installation of the drives on the trailing edge of the wing or centrally in the fuselage may result in installation problems and increased installation expenditure (for example, because the design space on the trailing edge of the wing is limited or because corresponding leadthroughs etc. have to be provided), essentially the entire drive system is integrated in the track of the aircraft. Furthermore, this may make it possible to pre-integrate all the drive components in the track.

FIG. 5A shows a lateral view 505 and FIG. 5B a top view 500 of a track-integrated landing flap drive system with a rotary actuator according to one embodiment of the present invention. As shown in FIG. 5A and FIG. 5B the landing flap drive system comprises a first drive motor 501 for operating the landing flap 107. In this arrangement the landing flap drive system is completely integrated in the track 509 of the landing flap 107. The motor unit 501 is controlled by way of motor electronics 503. The motor electronics 503 are connected by way of corresponding interfaces to a signal line for controlling the landing flap drive system. Furthermore, an interface for connecting the landing flap drive system to an energy supply is provided. The supply interface and the signal line interface can for example be arranged in the supply connection 504, which during final installation of the track 509 is connected at the wing of the aircraft to a corresponding counter interface.

Furthermore, an actuator 502, designed in the form of a rotary actuator 502, is provided. In this arrangement, the actuator 502 is driven by the motor unit 501, wherein the actuator 502 operates the landing flap 107 by way of corresponding mechanical operating means 506 in conjunction with linkages 507.

As shown in the top view 500 of FIG. 5A, furthermore, a safety load path 508 is provided, which is used to ensure structural integrity. For example, the safety load path 508 can be designed so that in the case of structural failure of the landing flap drive system the landing flap 107 is held in its position.

According to an embodiment the landing flap drive system comprises individual electromechanical drives 501. In this arrangement the landing flap drive system comprises the drive motors 501; a step-down gear arrangement 511 (if necessary), which for example may be integrated in a rotary actuator; an actuator 502 which may be a rotary actuator; a brake device, which for example forms part of the drive mechanism 506; a safety load path 508; sensors and motor electronics 503.

Depending on the required availability, one or two motors may be used for each drive station. It may be also possible to provide additional motors so as to further enhance the redundancy and thus the system safety or the provision of output.

Depending on the selected motor speed in the optimum work point, for example, a step-down gear arrangement is installed. In order to set the landing flap drive system, a brake device can be provided. In this arrangement, both the step-down gear arrangement and the brake device are also integrated in the track 509. For example, brakes or gears/actuators with self-locking action can be used. If due to ensuring structural integrity, a safety load path 508 is necessary, then, this safety load path 508 can also be integrated in the track 509.

It should be noted that the detailed design of the system depends on system requirements such as, for example, availability, flexibility of functions etc. as well as on other boundary conditions such as, for example, the number of tracks for each flap segment.

The interfaces of the track 509 with the integrated landing flap drive system and the wing of the aircraft or its landing flaps are provided by the structural attachments of the track to the wing in the form of a first attachment region 510 and the connection of the landing flap drive system to the landing flap in the form of a second attachment region 506, 507. Furthermore, interfaces for supplying energy to the drives 501 and to the signal line 504 are provided. The first attachment region can of course also be arranged at some other position on the track 509.

Synchronisation of the drives 501 in the tracks 509 of a landing flap segment takes place electronically. According to one embodiment, to this effect, no mechanical coupling between the first drive motor 501 and a second drive motor is provided.

For example, for the purpose of synchronisation, position sensors can be provided on the actuators 502, the motors 501 or the mechanical operating elements 506 in order to carry out position determination. These sensors, for example, may be connected to the motor electronics 503 and to corresponding evaluation electronics that can also be integrated in the motor electronics. This does not require mechanical coupling of the different motor units 501.

FIG. 6A and FIG. 6B shows a further exemplary embodiment of a track-integrated landing flap drive system with a failsafe spindle drive 602. A lateral view 605 and a top view 600 of the landing flap drive system are shown.

As shown in FIG. 6A and in FIG. 6B, in this case a fail-safe spindle is selected as an actuator so that there is no need for an additional safety load path.

Figure 7:
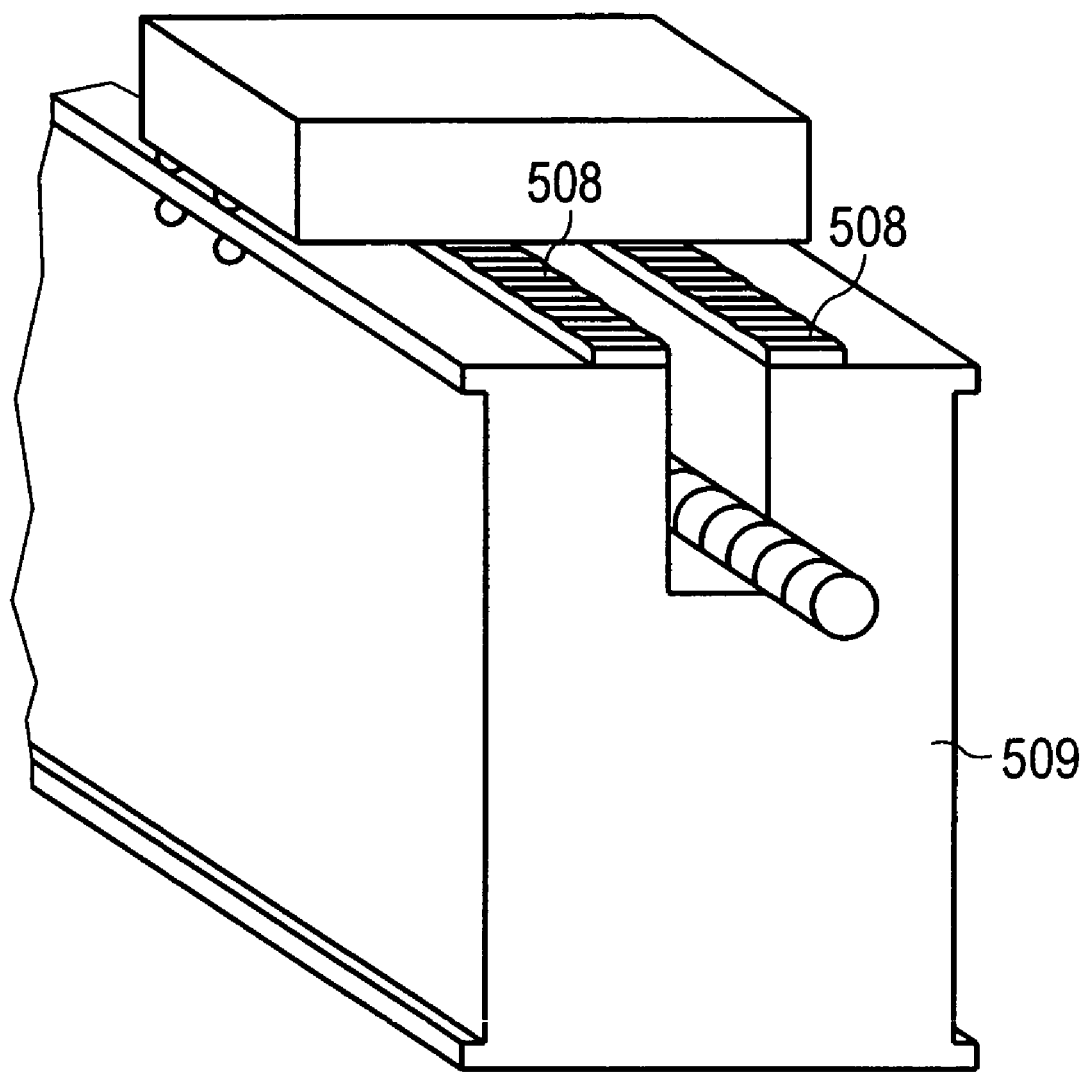
FIG. 7 shows a track-integrated landing flap drive system with a spindle drive and a tooth-arrangement brake according to a further embodiment.

FIG. 7 shows an embodiment of a track-integrated landing flap drive system with a simple spindle drive so that a further safety load path 508 in the form of a gear tooth arrangement is arranged on the track 509. Should a system failure be experienced, the safety load path 508 can hold the landing flap.

It should be noted that further embodiments may be possible. The fundamental principle may always consist of all the components of the drive system being arranged in, or on, the track 509.

With complete integration in the track 509, the installation expenditure may be significantly reduced. Furthermore, there may be no need to provide the structural leadthroughs through the fuselage and the trailing edge of the wing, which structural leadthroughs are necessary in the case of centrally-driven landing flaps, nor may there be any need for deflection gears and universal joints of the shaft arrangement. During final assembly a track equipped with all the system components may only need to be attached underneath the wing and may need to be connected to the supply lines, the signal lines and the flap structure. Furthermore, the problem of finding installation space in the case of redundant drives to be installed at the trailing edge of the wing may be solved in this way.

In addition it should be pointed out that "comprising" does not exclude other elements or steps, and "a" or "an" does not exclude a plurality. Furthermore, it should be pointed out that characteristics or steps which have been described with reference to one of the above embodiments can also be used in combination with other characteristics or steps of other embodiments described above. Reference characters in the claims are not to be interpreted as limitations.

Alternative combination and variations of the examples provided will become apparent based on this disclosure. It is not possible to provide specific examples for all of the many possible combinations and variations of the embodiments described, but such combinations and variations may be claims that eventually issue.

What is claimed is:

1. A track for an aircraft having a wing and a landing flap, the track comprising a track structure, a first attachment region coupled to the track structure, a second attachment region, and a track-integrated landing flap drive system integrated in the track structure and coupled to the second attachment region, wherein the first attachment region attaches the track to the wing of the aircraft, when the track is installed on the aircraft, and the track-integrated landing flap drive system is integrated within the track without separate structural attachment to the wing, such that the track-integrated landing flap drive system is attached to the wing as a unit with the track, when the track is installed on the aircraft, and the track-integrated landing flap drive system comprises:
   a track-integrated first drive motor;
   a track-integrated actuator coupled to the second attachment region, the second attachment region coupling the landing flap of the aircraft to the track-integrated actuator, when the track is installed on the aircraft, and when the track is installed on the aircraft, the track integrated actuator couples the first drive motor and the landing flap, wherein the landing flap is movably coupled to the wing of the aircraft; and
   track-integrated motor control electronics electrically coupling the first drive motor of the track-integrated landing flap drive system to the aircraft, wherein the track-integrated motor control electronics synchronize operation of the track-integrated first drive motor and a second independent drive motor of a second track without mechanical coupling between the track-integrated first drive motor and the second drive motor when the track is installed on the aircraft.

2. The track of claim 1, further comprising:
   a step-down gear arrangement for reducing an operation speed of the landing flap.

3. The track of claim 1, further comprising:
   a brake device for setting the position of the landing flap.

4. The track of claim 1, further comprising:
   a safety load path to ensure structural integrity;
   wherein the safety load path is capable of holding the landing flap in the case of structural failure.

5. The track of claim 1, wherein the track-integrated motor control electronics comprise:
   a first interface for connecting the landing flap drive system to an energy supply;
   a second interface for connecting the landing flap drive system to a signal line for controlling the landing flap drive system.

6. The track of claim 1, wherein the first drive motor is an electromechanical motor.

7. An aircraft with a track of claim 1.

8. The track of claim 1, wherein the actuator is self braking.

9. The track of claim 8, wherein the actuator is a fail-safe spindle drive.

10. The track of claim 1, wherein the track-integrated motor control electronics of the track-integrated landing flap drive system of the track are capable of synchronizing operation of the track-integrated first drive motor with the second independent drive motor, when the track is installed as a unit on the aircraft by attaching the first attachment region to the wing, coupling the second attachment region to the landing flap and connecting the track-integrated motor control electronics to an electrical supply line and signal lines of the aircraft, without any mechanical lead-through in a structural fuselage of the aircraft for the landing flap drive system.

11. The track of claim 1, wherein the actuator is arranged inside the track.

\* \* \* \* \*